United States Patent
Tang et al.

(10) Patent No.: US 10,164,538 B1
(45) Date of Patent: Dec. 25, 2018

(54) DUAL-CAPACITORS-BASED AC LINE FREQUENCY LOW VOLTAGE DC POWER SUPPLY CIRCUIT

(71) Applicant: Mosway Semiconductor Limited, Tsuen Wan, Hong Kong SAR (CN)

(72) Inventors: Chi-Keung Tang, Hong Kong SAR (CN); Chiu-Sing Celement Tse, Hong Kong SAR (CN); Ngai Wa Wong, Hong Kong SAR (CN)

(73) Assignee: Mosway Semiconductor Limited, Tsuen Wan, Hong Kong SAR (CN)

( * ) Notice: Subject to any disclaimer, the term of this patent is extended or adjusted under 35 U.S.C. 154(b) by 0 days.

(21) Appl. No.: 15/622,470

(22) Filed: Jun. 14, 2017

(51) Int. Cl.
H02M 3/28 (2006.01)
H02M 1/08 (2006.01)
H02M 3/335 (2006.01)
G05F 1/46 (2006.01)

(52) U.S. Cl.
CPC ............. *H02M 3/285* (2013.01); *G05F 1/46* (2013.01); *H02M 1/08* (2013.01); *H02M 3/33592* (2013.01)

(58) Field of Classification Search
CPC .... H02M 3/28; H02M 3/285; H02M 3/33507; H02M 3/33523; H02M 3/33569; H02M 3/33592; H02M 1/08; G05F 1/46
USPC ........................ 363/15, 16, 21.15, 22, 24, 26
See application file for complete search history.

(56) References Cited

U.S. PATENT DOCUMENTS

| | | | | |
|---|---|---|---|---|
| 3,908,159 A | * | 9/1975 | Griffey | G05F 1/613 323/901 |
| 5,481,449 A | * | 1/1996 | Kheraluwala | H02M 1/4208 323/259 |
| 2006/0232244 A1 | * | 10/2006 | Vieira Formenti | H02J 7/027 320/128 |

* cited by examiner

*Primary Examiner* — Yemane Mehari
(74) *Attorney, Agent, or Firm* — Alix, Yale & Ristas, LLP

(57) ABSTRACT

A supply circuit includes a rectifying bridge arranged in series between two high voltage capacitors. An AC line provides an intermediate voltage to a low voltage capacitor through the two high voltage capacitors. A plurality of resistors mounted in series with the two high voltage capacitors. A voltage clamping device limits the intermediate voltage at the low voltage capacitor and a linear series regulator provides an output DC voltage.

11 Claims, 14 Drawing Sheets

(Normal Load)

(Light Load)

(Normal Load)

(Light Load)

DUAL-CAPACITORS-BASED AC LINE FREQUENCY LOW VOLTAGE DC POWER SUPPLY CIRCUIT

BACKGROUND OF THE INVENTION

The present invention relates to low voltage DC power supply circuits. The invention more particularly, although not exclusively, relates to dual-capacitor-based AC line frequency supply circuits for low voltage DC power.

Prior art low power off-line AC-DC power supplies are shown in FIGS. 1-7. FIG. 1 shows a low voltage DC that is obtained by a resistor and voltage clamping device. A circuit using a typical implementation of a linear shunt regulator, such as this method, is simple in design and low cost. However, the circuit suffers from a number of drawbacks. There is a large power loss in the resistor R1. A typical loss is 220V×15 mA=3.3 W; (where $I_{out}$=10 mA and $I_{Zener\ diode}$=5 mA). The resistor and voltage clamping device also exhibit low efficiency, poor thermal performance regarding power loss handling, and poor line and load regulation.

FIG. 2 shows a high voltage ("HV") input linear shunt regulator. Compared to the circuit of FIG. 1, the HV input linear shunt regulator circuit gives a better voltage regulation at $V_{out}$. However, the HV circuit suffers from similar disadvantages to the resistor and voltage clamping device depicted in FIG. 1. Specifically, the HV input linear shunt regulator circuit suffers from high power loss in the series pass transistor, poor thermal performance, and needs a high voltage device as the series pass transistor.

FIG. 3 shows a current source tied from a high-voltage rectified DC ($V_{rect}$). The circuit for this method may reduce the power loss compared to the circuit in FIG. 1, but the current source must be a high-voltage device. This increases the cost of implementation. The inherent V-I loss on the current source itself is also still significant.

FIG. 4 shows a HV current source that supplies the start-up current with an auxiliary coil that supplies the operating current. The depicted controller has a built-in oscillator to drive the inductor to provide the appropriate DC voltage through the auxiliary coil. This circuit is undesirable because the current source must be operating at high voltage and the circuit itself is more complex. The transformer required to attain the appropriate DC voltage is expensive and there is poor EMI performance.

FIG. 5 shows a low-power switching mode power supply ("SMPS"). A low-power SMPS may be used to supply the DC output voltage to the load. However, the power loss overhead for the SMPS is very high if it is supposed to deliver only 10 mA 5 V to the load. This results in a low efficiency circuit with poor EMI performance and there is audio noise as well.

FIG. 6A shows a one-sided AC charge pump circuit connected to either LIVE or NEUTRAL lines. It is comprised of C3, C4, D5, D6 and a voltage clamping device. When V(neutral) is going up, C4 is charged and pumped to C3 via D5 as VC voltage which is clamped by the voltage clamping device. When V(neutral) is going down, C4 is discharged to the load through the discharging path. At the same time, a flatter voltage can be obtained at VC by smoothing VD with C3 and D5. By connecting VC to a regulator, we may easily get a DC output at $V_{out}$ to drive a controller circuit.

Referring to FIG. 6B, under the case of normal load R1 on the $V_{rect}$ line, C4 is fully discharged, and V(neutral) will reach 0 V during the AC cycle. In such case, $V_{rect}$ will look like a rectified AC voltage which peak is about 220 V*1.414=310 V.

The advantages of this circuit are that it is a simple design that is low in cost. There are no inductors and there is a good line harmonic current. The circuit also results in relatively low power loss.

However, if there is only light load R1 on the $V_{rect}$ line, the voltage of C4 will not be fully discharged to 0 V during the AC cycle as shown in FIG. 6C, and it will store the peak AC voltage (about 300 V) in C4. On top of this, $V_{rect}$ will be built up to a peak of 600 V+(or the peak-to-peak AC voltage at maximum). It may cause breakdown to the device attached to Vrect line (e.g. HV capacitor, MOS switching device, etc.). As there is only a small ripple on V(neutral) relative to GND, it is not sufficient to pump up the voltage at VC. Hence, the circuit cannot operate properly under the light load condition. This is mainly caused by the imbalance condition of the main rectifying bridge on the LIVE or NEUTRAL lines.

FIG. 7A shows a one-sided AC charge pump on a $V_{rect}$ line with extra resistance for standby power. To cater to the imbalance issue, the one-sided AC charge pump input may be connected directly to the $V_{rect}$ line that will have sufficient ripple to charge C4 and pump C3 to the desirable voltage at VC (see waveforms depicted in FIG. 7B). As it is in balanced condition, the $V_{rect}$ peak will only be the peak of the AC voltage (e.g. 220 V×1.414=310 V at maximum)

However, at light load condition, the ripple may not be high enough for the AC charge-pump action. So the $V_{rect}$ line requires loading by R1 to dissipate the minimum power so as to maintain the minimum ripple in order to ensure the charge-pump action. Otherwise, VC will not reach the desirable voltage level. As a result, some minimum power is dissipated in R1, so it will reduce the overall efficiency.

SUMMARY

Briefly stated, a dual-capacitor based AC line-frequency supply circuit is provided.

The supply circuit includes a rectifying bridge arranged in series between two high voltage capacitors. An AC line charges the intermediate (low-voltage) capacitor through the two high voltage capacitors and the rectifying bridge. A voltage clamping device limits the intermediate voltage at the low voltage capacitor and a regulator provides an output voltage.

The two high voltage capacitors ensure a balanced load on the AC line during successive AC voltage cycles. The optional plurality of resistors limit the inrush current supplied to the high voltage capacitors under the condition of AC voltage surge and spike. The output voltage provided by the supply circuit is DC.

The AC line voltage can charge the intermediate low-voltage capacitor via two high-voltage capacitors through the rectifying bridge. Compared to the one-sided AC charge pump method described above, this dual-capacitor based method ensures a balanced load on the AC line at each AC voltage cycle.

BRIEF DESCRIPTION OF THE DRAWINGS

Preferred forms of the present invention will now be described by way of example with reference to the accompanying drawings, wherein.

DETAILED DESCRIPTION

Figure 1:
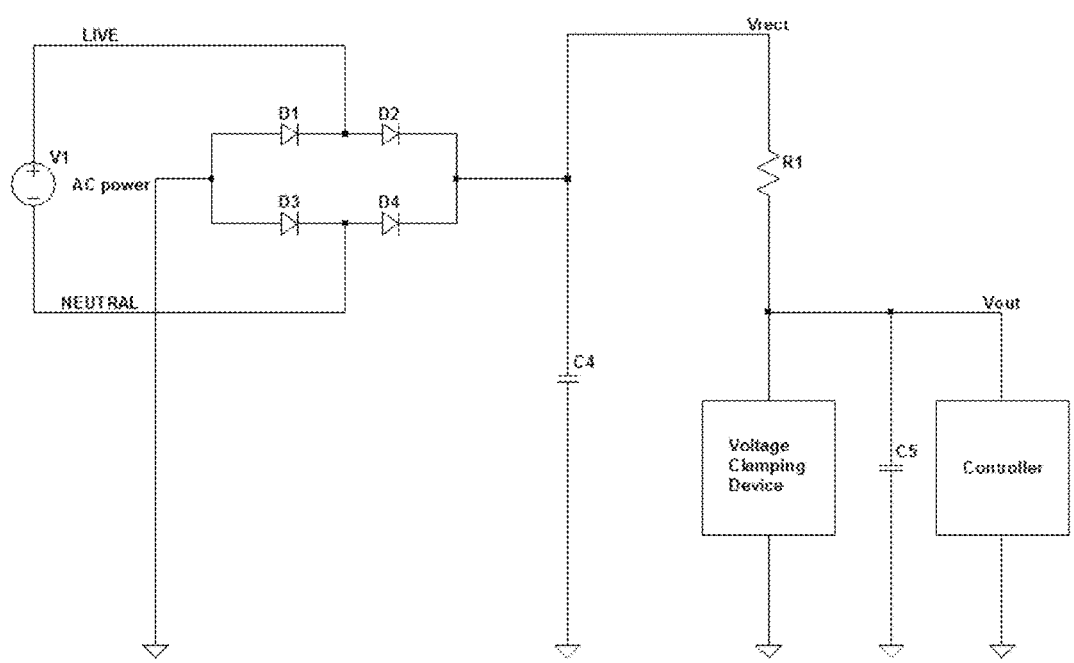
FIG. 1 shows a typical prior art low voltage DC circuit obtained by a resistor and voltage clamping device.
Figure 2:
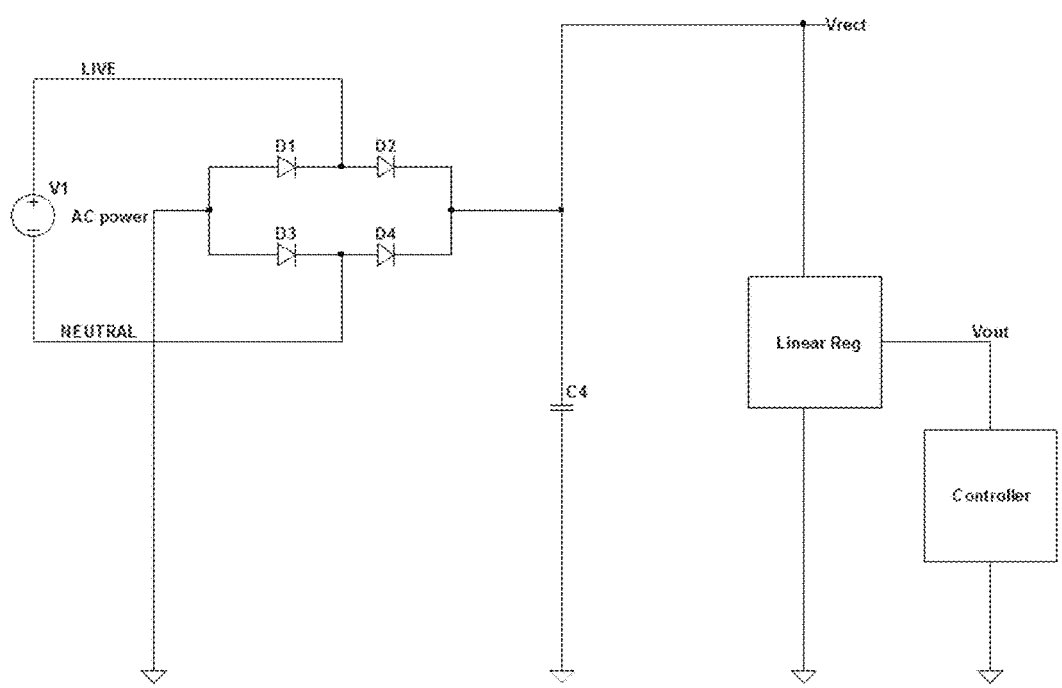
FIG. 2 shows a typical prior art high voltage input linear shunt regulator circuit.
Figure 3:
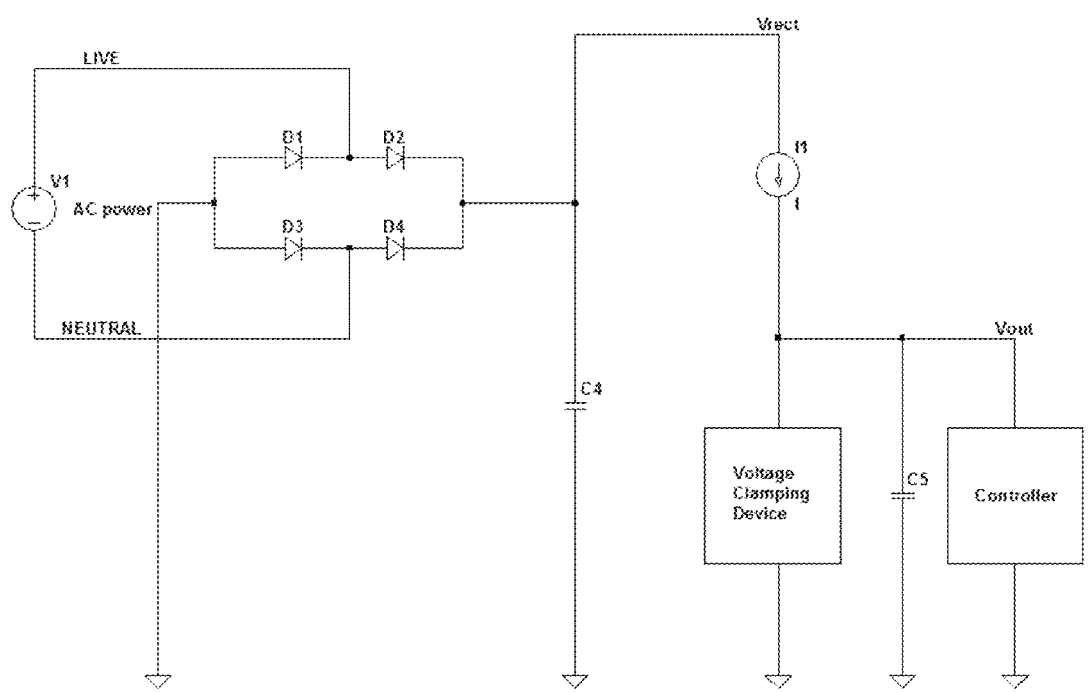
FIG. 3 shows a typical prior art current source tied from a high voltage rectified DC circuit.
Figure 4:
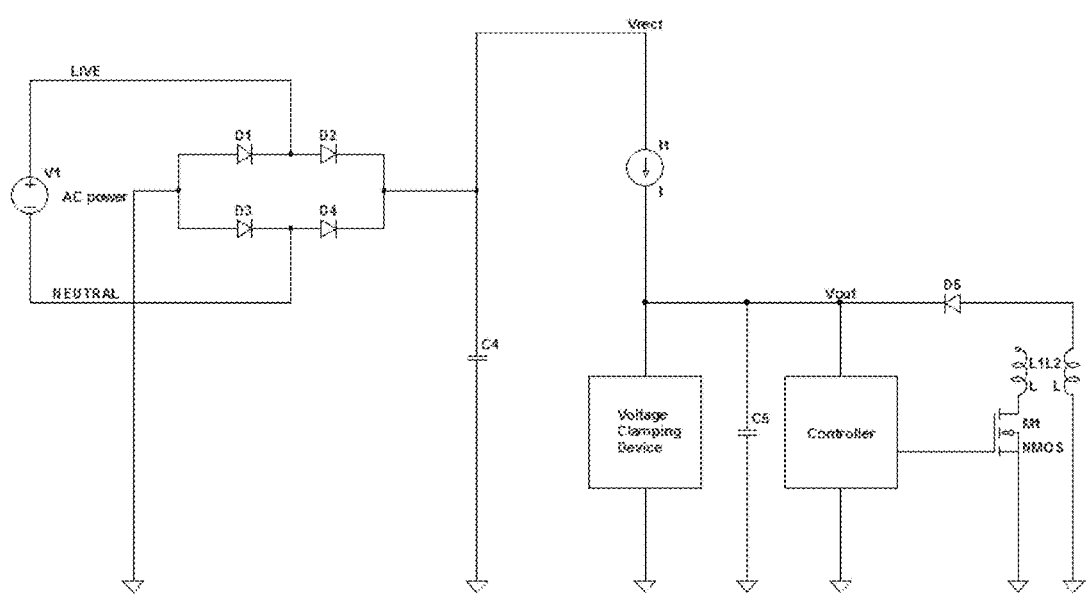
FIG. 4 shows a typical prior art high voltage current source supplying the start-up current and auxiliary coil supplying the operating current circuit.
Figure 5:
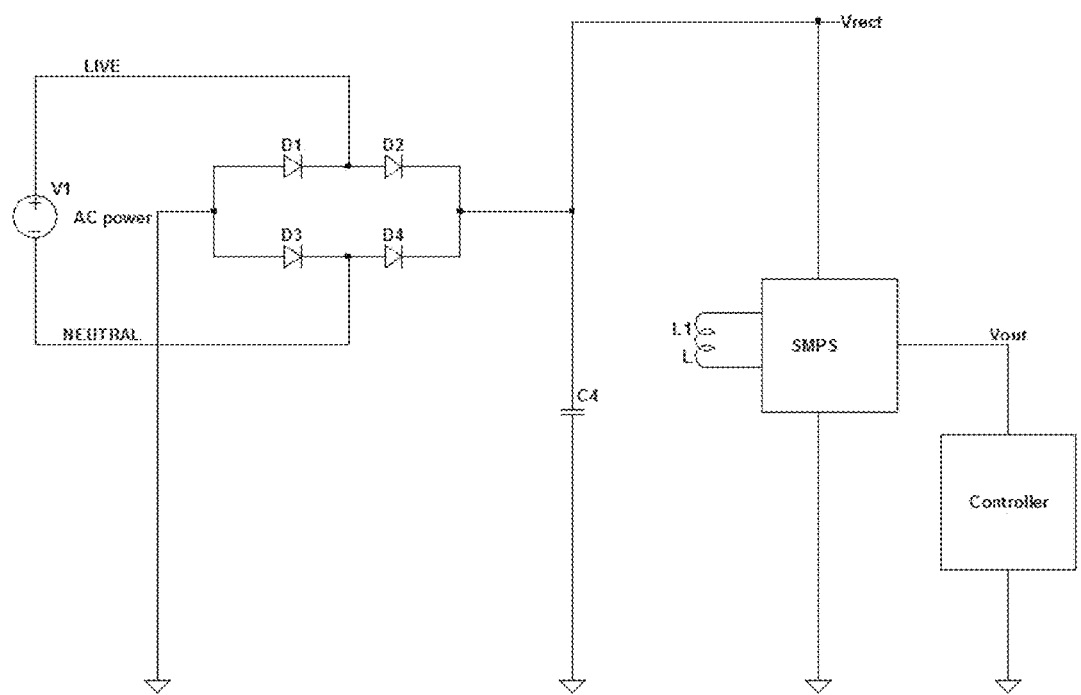
FIG. 5 shows a typical prior art low power SMPS circuit.
Figure 6A:
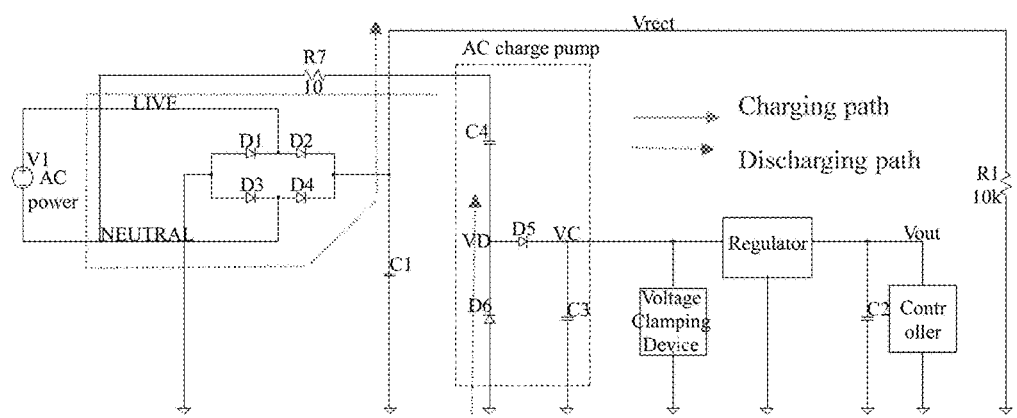
FIG. 6A shows a typical prior art one-sided AC charge pump circuit connected to LIVE or NEUTRAL.
Figure 6B:
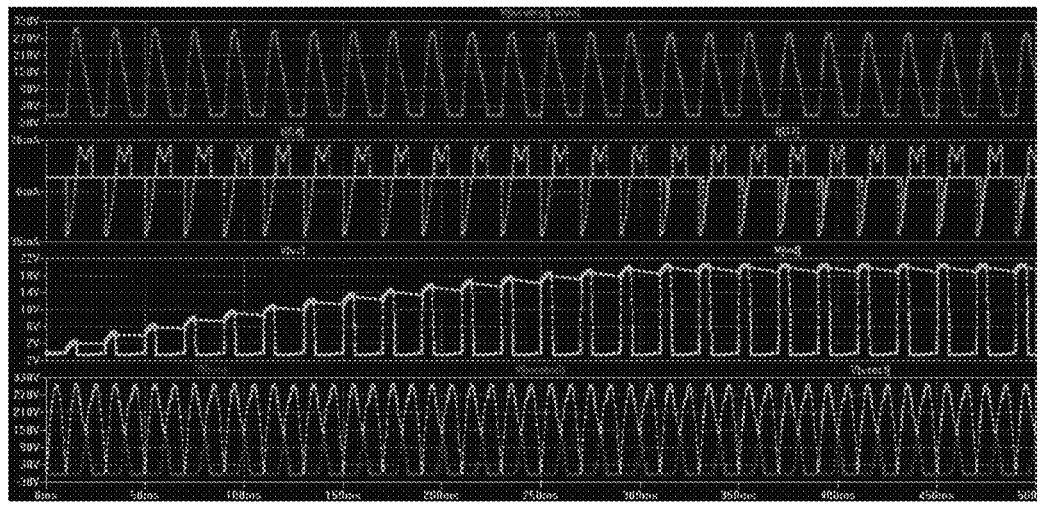
FIG. 6B shows the waveforms of the circuit of FIG. 6 during normal operation when C4 is fully discharged.
Figure 6C:
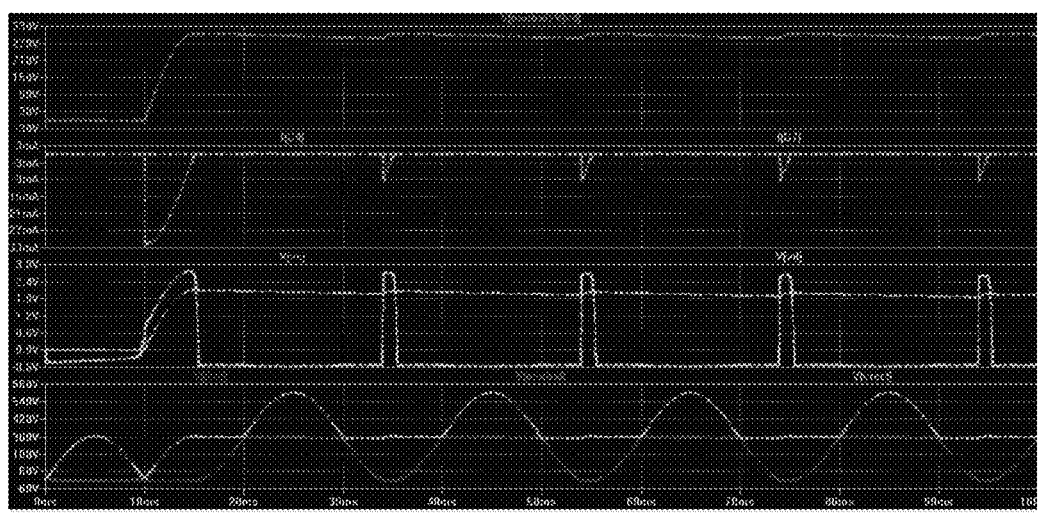
FIG. 6C shows the waveforms of the circuit of FIG. 6 if the voltage of C4 is not fully discharged.
Figure 7A:
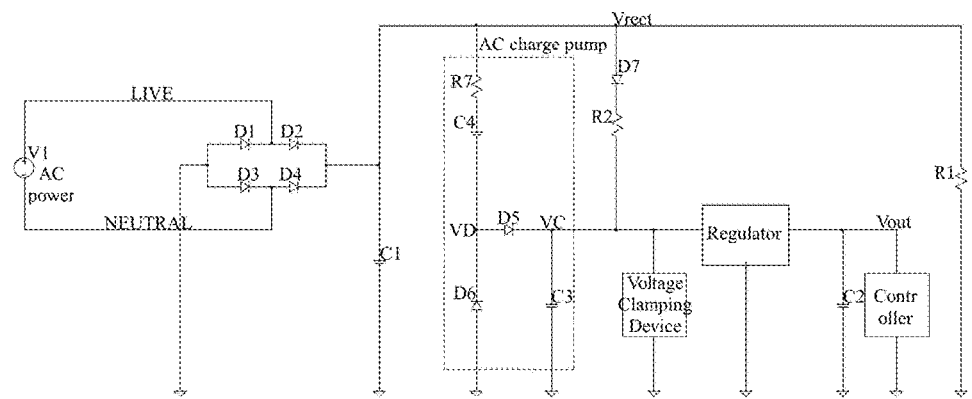
FIG. 7A shows a typical prior art one-sided AC charge pump on a $V_{rect}$ line with an extra resistor for standby power.
Figure 7B:
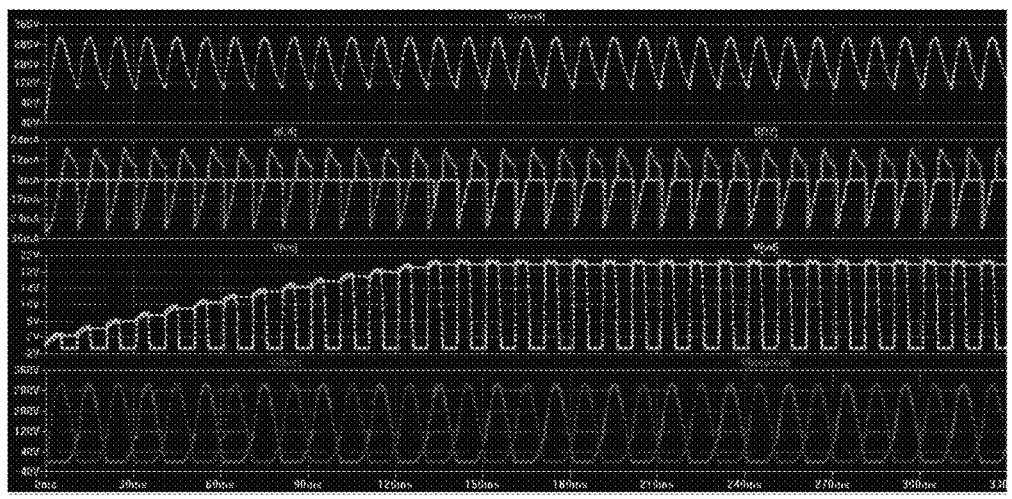
FIG. 7B shows the waveforms of the voltage at the VC of the circuit of FIG. 7A.
Figure 8:
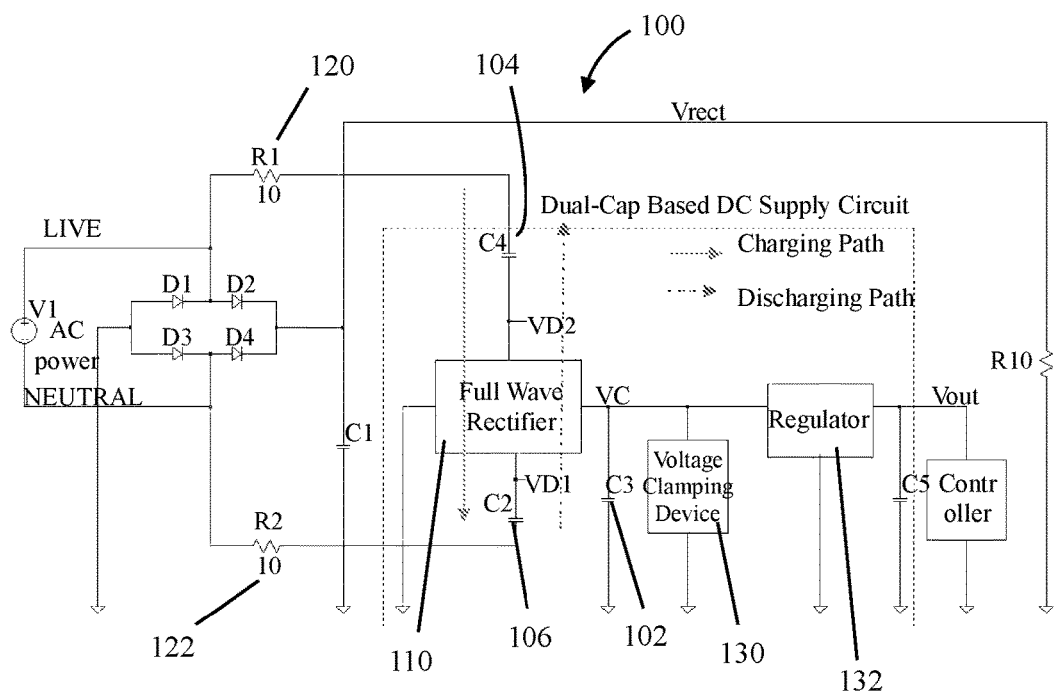
FIG. 8 is a schematic circuit diagram for one embodiment of the disclosed low voltage DC power supply using dual capacitors operating at AC line frequency.

With reference to the drawings wherein like numerals represent like parts throughout the figures, is a schematic circuit diagram for an embodiment of the disclosed dual-capacitor based AC line frequency low voltage DC power supply circuit is designated by the numeral 100 in FIG. 8.

Figure 9A:
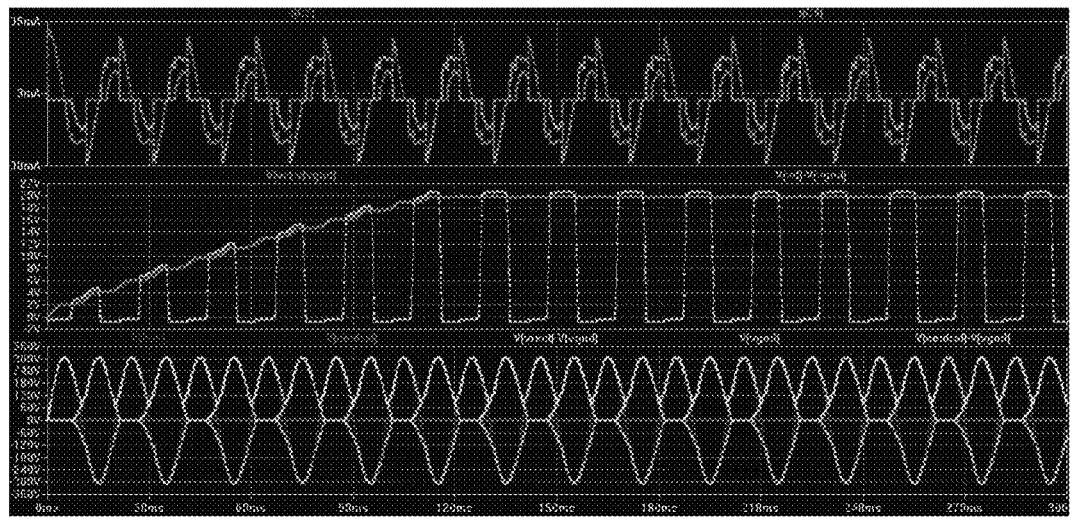
FIG. 9A shows the waveforms of the current of the high-voltage capacitors of the circuit of FIG. 8 (normal load)

The AC line voltage charges the intermediate low-voltage capacitor 102 via two high-voltage capacitors 104, 106. The two high-voltage capacitors 104, 106 are charged through the full wave rectifying bridge 110. The inrush current is limited by two resistors 120, 122, each mounted in series with a high-voltage capacitor 104, 106. The charging and discharging of current of the high-voltage capacitors 104, 106 is shown in FIG. 9A.

The dual high-voltage capacitors 104, 106 ensure a balanced load on the AC line at each AC voltage cycle. As a result, there will be no imbalanced peak voltages at $V_{rect}$ that could otherwise go up to a much higher peak. Therefore, the maximum voltage at $V_{rect}$ is kept at the peak AC voltage (i.e. 220 V*1.414=310 V). Omitting the dual high-voltage capacitors 104, 106 would require a higher withstand voltage specification for devices attached to the $V_{rect}$ side.

The voltage clamping device 130 limits the intermediate voltage VC at the low-voltage capacitor 102. In the depicted embodiment, the intermediate voltage VC is typically between 4 V and 40 V. The linear series regulator 132 gives a DC output voltage at $V_{out}$. The DC output voltage is typically 3 V to 5 V for a 10 mA load. As there is no switching element, the linear series regulator 132 has good line harmonic current response and EMI performance.

Figure 9B:
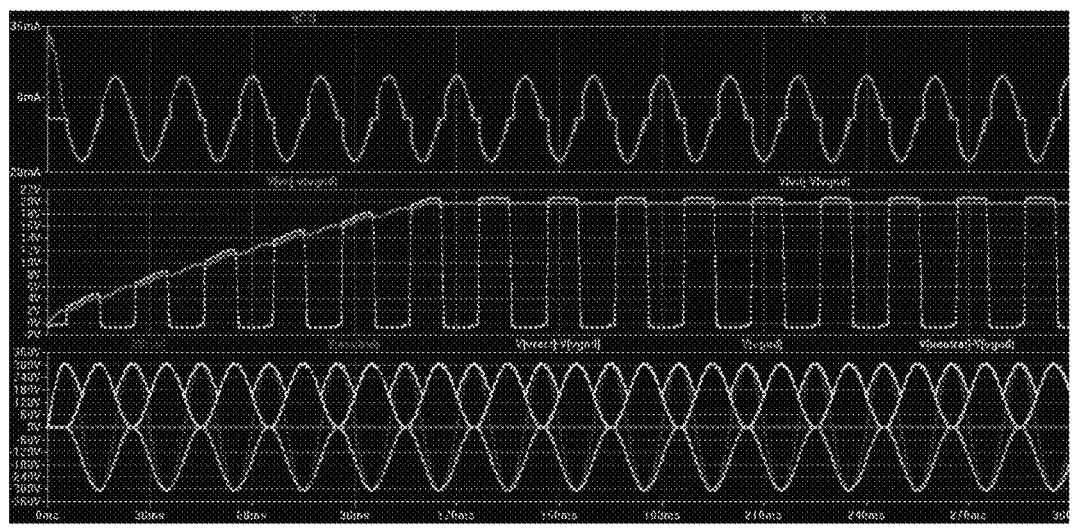
FIG. 9B shows the waveforms of the $V_{rect}$ of the circuit of FIG. 8 (light load)

When there is only light load, it can still be maintained in a balanced condition. The two high-voltage capacitors 104, 106 can effectively be treated in series. Their charging and discharging currents are essentially the same. As a result, the $V_{rect}$ peak voltage will still be kept within normal rating (i.e. peak AC voltage) as shown in the wave form of FIG. 9B.

The dual-capacitor based AC line frequency low voltage DC power supply circuit 100 exhibits relatively low power loss which leads to good thermal response. The simple circuit design also provides good line harmonic current and the inductorless design significantly lowers the cost. There is no switching noise which improves the EMI performance, and the circuit allows a balanced load on the LIVE and NEUTRAL lines compared to one-sided AC charge pump schematics.

Figure 10:
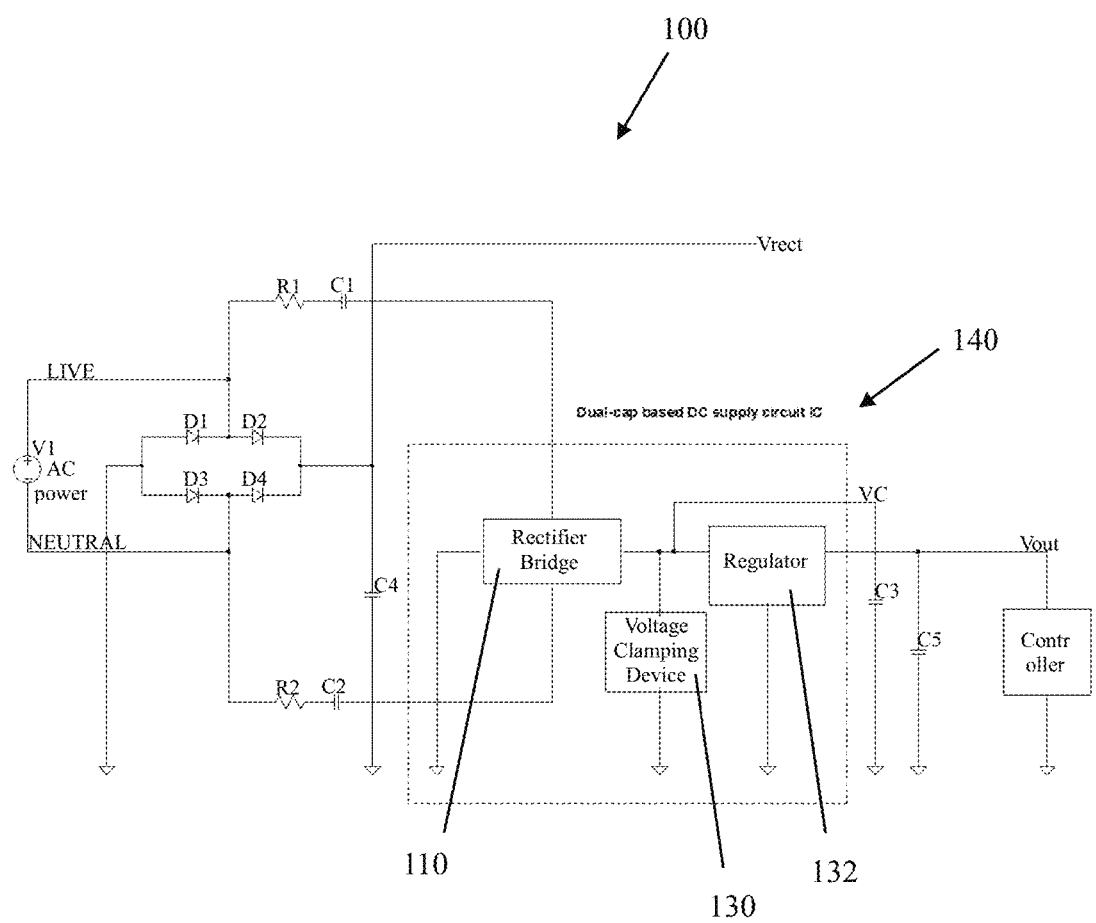
FIG. 10 is a schematic circuit diagram of another embodiment of the disclosed low voltage DC power supply using dual capacitors operating at AC line frequency.

In the embodiment depicted in FIG. 10, the major part of the circuit is designed in the form of integrated circuit 140. The integrated circuit 140 comprises a rectifier bridge 110, voltage clamping device 130, and linear series regulator 132. This allows the second rectifier bridge 110 to be implemented as synchronous rectifiers. This further reduces the forward voltage drop loss and further improves the power efficiency.

Figure 11A:
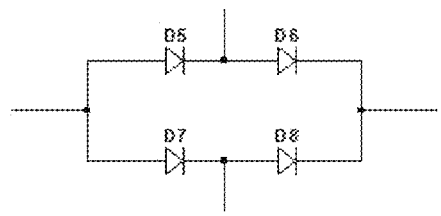
FIG. 11A is a schematic circuit diagram of a rectifier for the circuit of FIG. 10.
Figure 11B:
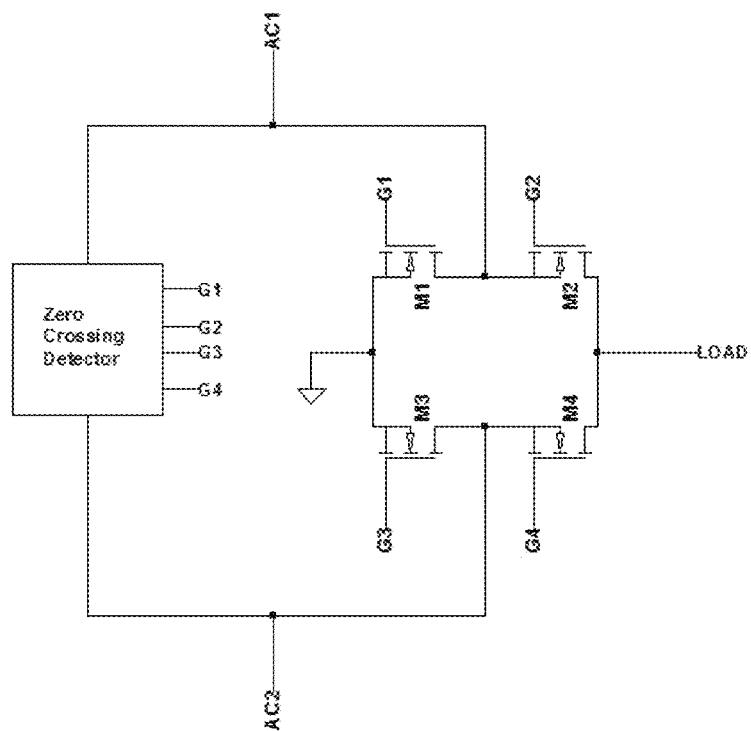
FIG. 11B is a schematic circuit diagram of an alternative rectifier for the circuit of FIG. 10.
Figure 12A:
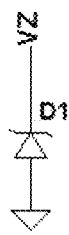
FIG. 12A is a schematic circuit diagram of a voltage clamping device for the circuit of FIG. 10.
Figure 12B:
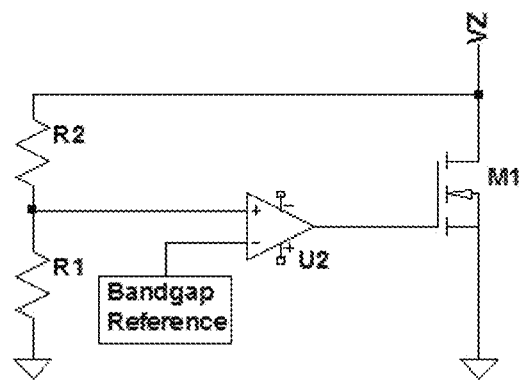
FIG. 12B is a schematic circuit diagram of an alternative voltage clamping device for the circuit of FIG. 10.
Figure 13:
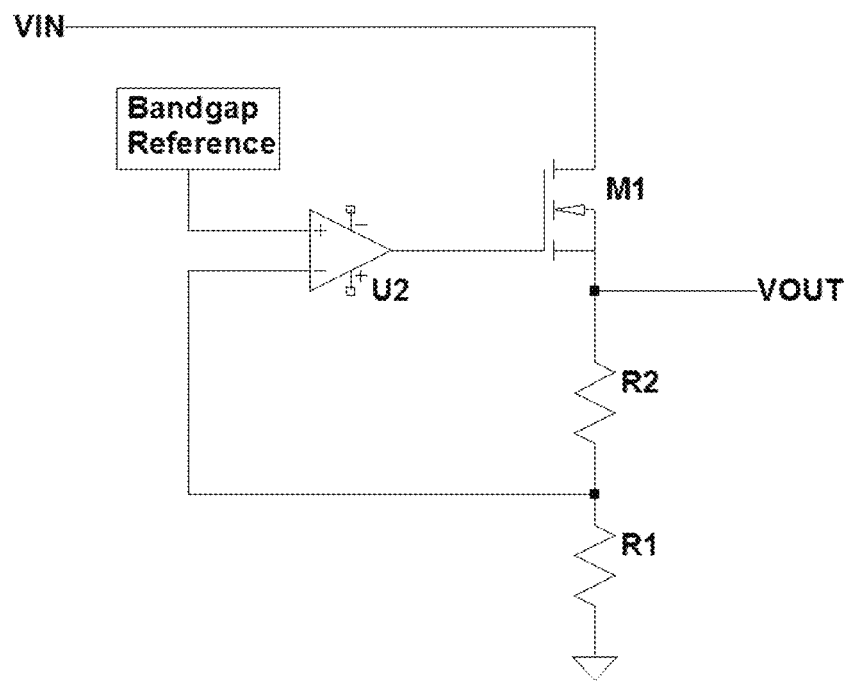
FIG. 13 is a schematic circuit diagram of a $V_{out}$ linear series regulator for the circuit of FIG. 10.

The rectifier bridge 110 can be four diodes (as depicted in FIG. 11A), four synchronous rectifying devices implemented by MOSFET (as depicted in FIG. 11B), or a combination of both four diodes and MOSFET. The voltage clamping device 130 can be either a Zener diode (as depicted in FIG. 12A) or an error amplifier and MOSFET (as depicted in FIG. 12B). Referring to FIG. 13, the $V_{out}$ regulator 130 can be a linear series regulator or an LDO regulator.

Although a dual-capacitor based AC line frequency low voltage DC power supply circuit 100 is described, other embodiments are envisaged to be within the scope of this specification. Therefore, while there has been described in the foregoing description preferred embodiments of the present invention, it will be understood by those skilled in the technology concerned that many variations or modifications in details of design, construction or operation may be made without departing from the scope of the present invention as claimed.

The invention claimed is:

1. A low voltage DC power supply circuit comprising:
   a rectifier bridge arranged in series between two high voltage capacitors;
   an AC line that provides an intermediate voltage to a low voltage capacitor through said two high voltage capacitors;
   a voltage clamping device that limits the intermediate voltage at said low voltage capacitor; and
   a linear series regulator that provides an output voltage;
   wherein said two high voltage capacitors ensure a balanced load on said AC line during successive AC voltage cycles and the output voltage is DC.

2. The low voltage DC power supply circuit of claim 1, wherein said rectifier bridge, said voltage clamping device, and said regulator are included in an integrated circuit.

3. The low voltage DC power supply circuit of claim 1, further comprising a plurality of resistors mounted in series with said two high voltage capacitors, wherein said plurality of resistors limit an inrush current supplied to said high voltage capacitors.

4. The low voltage DC power supply circuit of claim 1, wherein said rectifier bridge comprises four separate diodes.

5. The low voltage DC power supply circuit of claim 1, wherein said rectifier bridge comprises four synchronous rectifying devices implemented by a MOSFET.

6. The low voltage DC power supply circuit of claim 1, wherein said rectifier bridge comprises a combination of four separate diodes and four synchronous rectifying devices implemented by a MOSFET.

7. The low voltage DC power supply circuit of claim 1, wherein said voltage clamping device is a Zener diode.

8. The low voltage DC power supply circuit of claim 1, wherein said voltage clamping device is an error amplifier and a MOSFET.

9. The low voltage DC power supply circuit of claim 1, wherein said regulator is an LDO regulator.

10. The low voltage DC power supply circuit of claim 1, wherein the intermediate voltage is between 4 V and 40 V.

11. The low voltage DC power supply circuit of claim 1, wherein a peak AC voltage is 310 V±10% or 155 V±10%.

* * * * *